(12) United States Patent
Newcomb

(10) Patent No.: US 10,853,543 B1
(45) Date of Patent: Dec. 1, 2020

(54) LOGICAL DETECTION OF ELECTRONIC CIRCUIT POWER SEQUENCE RISKS

(71) Applicant: Jesse Conrad Newcomb, San Francisco, CA (US)

(72) Inventor: Jesse Conrad Newcomb, San Francisco, CA (US)

( * ) Notice: Subject to any disclaimer, the term of this patent is extended or adjusted under 35 U.S.C. 154(b) by 0 days.

(21) Appl. No.: 16/776,118

(22) Filed: Jan. 29, 2020

Related U.S. Application Data

(63) Continuation-in-part of application No. 16/440,875, filed on Jun. 13, 2019.

(60) Provisional application No. 62/848,922, filed on May 16, 2019, provisional application No. 62/826,333, filed on Mar. 29, 2019.

(51) Int. Cl.
*G06F 30/327* (2020.01)
*G06F 119/06* (2020.01)

(52) U.S. Cl.
CPC ........ *G06F 30/327* (2020.01); *G06F 2119/06* (2020.01)

(58) Field of Classification Search
USPC ........................................................ 716/104
See application file for complete search history.

(56) References Cited

U.S. PATENT DOCUMENTS

| | | | | |
|---|---|---|---|---|
| 8,225,251 B2* | 7/2012 | Newcomb | ............. | G06F 30/367 716/106 |
| 8,484,590 B2* | 7/2013 | Newcomb | ........... | G06F 30/3323 716/106 |
| 8,504,957 B2* | 8/2013 | Newcomb | ............. | G06F 30/367 716/109 |
| 8,504,968 B2* | 8/2013 | Newcomb | ............. | G06F 30/367 716/120 |
| 8,881,076 B2 | 11/2014 | Newcomb | | |
| 9,378,324 B2* | 6/2016 | Newcomb | ........... | G06F 30/3323 |
| 2005/0143966 A1* | 6/2005 | McGaughy | ........... | G06F 30/367 703/3 |
| 2005/0216872 A1* | 9/2005 | Sung | ....................... | G06F 30/30 716/103 |
| 2011/0196642 A1* | 8/2011 | Newcomb | ............... | G06F 30/30 702/127 |

(Continued)

OTHER PUBLICATIONS

US 8,595,600 B2, 11/2013, Newcomb (withdrawn)

*Primary Examiner* — Mohammed Alam
(74) *Attorney, Agent, or Firm* — Stephen E. Zweig

(57) ABSTRACT

An automated method of determining power sequencing risks (e.g. power-up, power-down time sequences) for complex computer circuits with multiple independent power supplies. The method operates by logical consideration of the topological arrangement of MOSFETs and other devices in standard netlists. The invention inspects the various devices and automatically traces DC circuit paths to DC power rails. The invention then evaluates, as a type of logical existence proof, and on a per MOSFET device level, if due to assignment to different DC power levels, various factors, such as forward-biased diodes, floating MOSFET gate, and other risk factors could ever occur. The method generates comprehensive records of such risks and can output an overall analysis of a circuit reporting on both problematic power sequences, as well as circuit design factors that may be sub-optimal from a power sequence perspective.

15 Claims, 9 Drawing Sheets

(56) References Cited

U.S. PATENT DOCUMENTS

2012/0110528 A1* 5/2012 Newcomb ............ G06F 30/3323
716/106

* cited by examiner

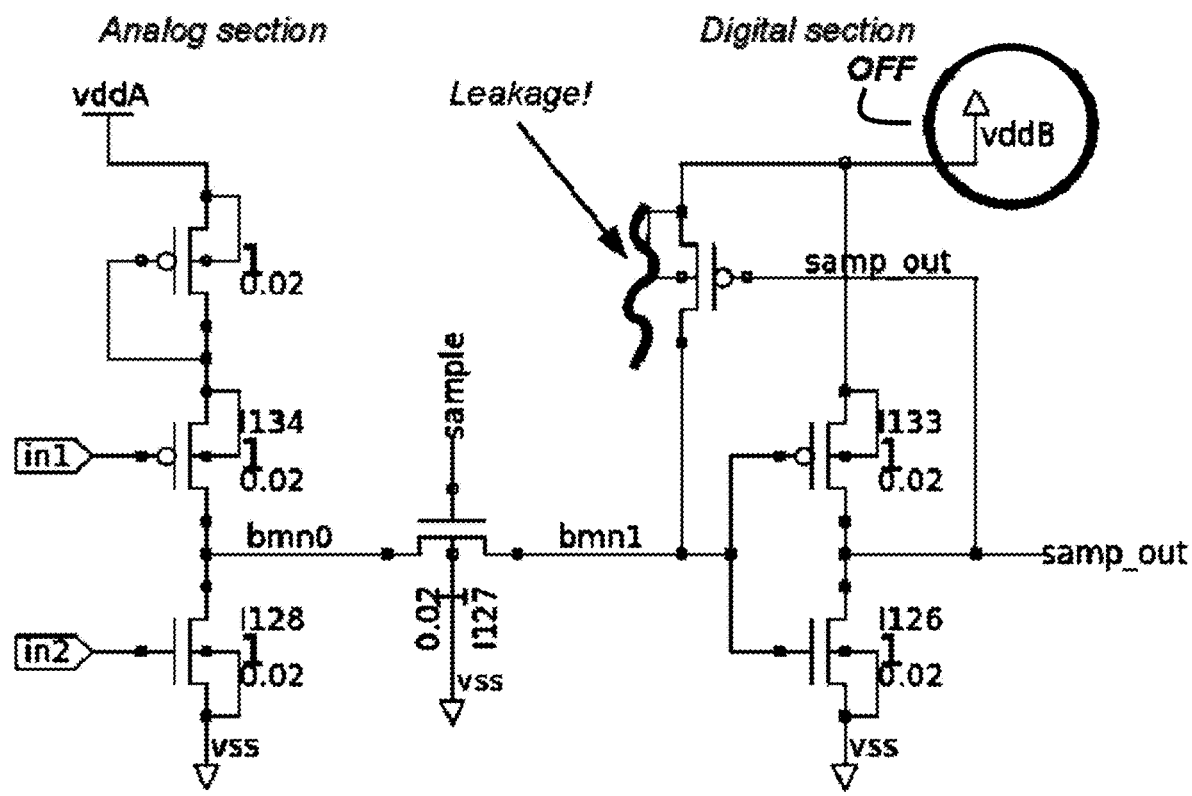

LOGICAL DETECTION OF ELECTRONIC CIRCUIT POWER SEQUENCE RISKS

CROSS-REFERENCE TO RELATED APPLICATIONS

This application is a continuation in part of U.S. patent application Ser. No. 16/440,875, filed Jun. 13, 2019, and also claims the priority benefit of U.S. provisional patent application 62/826,333, filed Mar. 29, 2019; and U.S. provisional patent application 62/848,922 filed May 16, 2019; the entire contents of these applications are incorporated herein by reference.

BACKGROUND OF THE INVENTION

Field of the Invention

This invention is in the field of software for the design and manufacturing of electronic circuits.

Description of the Related Art

Modern electronic circuits, such as integrated circuit chips, rely heavily on MOSFET (metal-oxide field-effect transistor) devices, which are often fabricated on silicon chip substrates. Modern integrated circuit chips often use thousands, millions, or even billions of MOSFET devices. These integrated circuit chips typically obtain DC power from multiple independent power supplies, which connect to multiple independent power rails on the chip. These independent power rails, in turn, split off into a large number of independent DC power paths, which ultimately deliver power to various circuit devices, such as the MOSFET chips, diodes, and other devices.

Although MOSFET technology is thus a key foundational technology for modern integrated circuit chips, MOSFET devices do have a few drawbacks. One inherent drawback to MOSFET technology is the presence of parasitic diodes in the silicon layers directly beneath the intended transistor. If the circuit design or manufacturing process is inappropriate, and power is applied or withdrawn from the circuit in a wrong sequence (e.g. a first power supply is turned on before a second power supply), these diodes can (A) conduct current (battery drain, leakage) and (B) the circuit may become latched up (stuck in a bad state).

Indeed, when a chip design has multiple power rails, there can be a number of circuit reliability risks that can arise due to the unpredictable nature of power-up and power-down sequences. This includes at least some reliability problems caused by electrostatic discharge (ESD) because ESD can be viewed as a type of semi-random transient application of electrical power to various rails of an electronic circuit. These circuit reliability problems include:

Degradation of MOSFET, change of characteristics; Long term reliability degradation. May be related to circuit undergoing many power-on/off cycles.

Latch-up, unrecoverable circuit state; Short term reliability, must reset or re-start all power.

Latch-up, high current; Short term reliability, chip damage. High current blows the chip.

Unexpected current drain; Chip does function normally but current is higher than normal. This can be a problem if the chip is powered by a small battery.

About parasitic diodes and other integrated circuit chip diodes:

Parasitic diodes (often called MOSFET body diodes) exist as by-product parts of MOSFET design. An example of such parasitic diodes is shown in FIG. 1. In this example, the intended transistor (MOSFET device) is shown as "P1". In this example, parasitic diodes exist from both drain to bulk (D2), and source to bulk (D1). These diodes are generally not intended or desired but exist as a result of stacking P and N layers in silicon in the process of creating the (multi-layer) integrated circuit chip. Typically, underneath the silicon layers, there exist other diodes, such as bulk to substrate diodes (not shown here) as well. In totality, and particularly in sub-optimal circuit designs, these diodes can combine to form other transistors, unwanted additional components to the intended MOS transistors (MOSFETs). A common manifestation is a bipolar transistor (BJT), or silicon control rectifier (SCR). Under certain applied voltage conditions (often unforeseen by the designers), these unwanted parasitic components can begin to conduct current, drawing power from the circuit. This conduction can be just a temporary current drain, or worse, a self-holding latch-up condition that continues drawing current even after the initial conditions are removed. Thus, improved methods to enable circuit designers to find circuit configurations that cause problematic power sequencing problems, thus enabling them to modify the circuit design and increase reliability, are of high interest in the field.

In general, prior art methods to evaluate circuit designs for power sequencing risks depend on computerized time-domain simulation methods and typically operate on specific IC design structures. These methods are exemplified by Berkeley SPICE and other SPICE variants. These prior art SPICE type computer circuit simulation methods typically operate upon a computer file, often called a netlist, that describes the various devices in the circuit, and how these devices are connected.

During the circuit design process, circuit design engineers and verification engineers typically run these prior art SPICE type simulations many times on a particular circuit, often at many phases of the design. However, each time the intent behind the simulation remains the same, which is to verify the behavior of the circuit in question.

Other prior art methods include various methods to encourage "good design practices".

Layout check type prior art methods are also known in the art. Such methods tend to focus on the layout (e.g. geometry, shape, placement) of single transistors, and typically don't analyze the circuit as a whole.

Logical and topological computerized circuit evaluation methods:

Recently, alternative methods to logically evaluate circuits, often by evaluating the various topological relationships between how the various devices are connected in a circuit netlist, have been proposed. Such prior art on the logical evaluation of circuits includes the work of Newcomb, U.S. Pat. Nos. 8,225,251; 8,484,590; 8,504,957; 8,504,968; 8,595,660; 8,881,076; and 9,378,324; the entire contents of which are incorporated herein by reference.

U.S. Pat. No. 8,484,590 taught automated methods of predicting electronic circuit floating gates. U.S. Pat. No. 8,504,957 taught methods to automatically identify power and ground nets in an integrated circuit netlist. U.S. Pat. No. 8,504,968 taught automated methods to determine high-level power distribution and interface problems in complex integrated circuits. U.S. Pat. No. 8,595,660 taught a method and system of automatically identifying level shifter circuits.

U.S. Pat. No. 9,378,324 taught a method and system of detecting design rule noncompliant subgraphs in circuit netlists.

BRIEF SUMMARY OF THE INVENTION

The present invention is based, in part, on the insight that prior-art computerized circuit simulation methods are poorly suited for discovering circuit design flaws that can lead to undesired behavior under certain power sequences. Put alternatively, in order to be useful, a given electronic circuit should be designed to operate correctly (e.g. "to be operative") under at least one power sequence. Unfortunately, this design goal is not always achieved. An important purpose of the invention is to disclose power sequence risks associated with achieving the underlying design goal of producing a fully operative circuit (e.g. a circuit that meets the design intent for that particular circuit).

As previously discussed, due in part to inadequacies in prior art simulation methods, there is an unmet need to find better ways to automatically evaluate a circuit design for situations where the circuit, through the various power rails, may be powered up or down in an unexpected manner. If a circuit is not properly optimized for such power sequencing issues, the chip can enter a state where undesired behavior, such circuit lockup in an undesired state, possibly even preventing circuit reset, may occur. Other problems can include unexpectedly large power utilization and accidental circuit damage.

These types of problems are particularly acute for modern highly complex and battery-powered electronic circuits based on MOSFET devices and associated parasitic diodes, such as smartphones, smartwatches, and other battery devices that often also obtain power from chargers, and thus can experience unexpected power supply fluctuations. It thus becomes increasingly important to design such chips to be resistant to unexpected power-up, power-down, and random (ESD), power sequences between the various power supplies and various DC power rails that provide power to such integrated circuit chips.

An important distinction between the logical and topological risk assessment methods taught herein, and prior art simulation-based methods, is that the methods disclosed herein do not require that the user anticipate all of the problematic power sequences in advance. By contrast, with prior art simulation methods, the simulator merely operates on the user input power sequences, but if the problematic power sequences are not entered, the simulator will tend to miss problems caused by such problematic power sequences.

That is, prior art simulation methods depend on specific input conditions. However, particularly for complex circuit designs with many independent DC power rails and DC power paths, it is difficult to anticipate all power sequence permutations in advance. Because of the large number of power sequence permutations (e.g. a large number of power-up sequences, a large number of possible power-down sequences), the simulator may not be given just the right "wrong" sequence to analyze, and thus miss such problems. Thus, for example, while simulation continues to be very useful for verifying circuits in standard operating modes, simulation is relatively poor at verification of initial power-up modes, due to a large number of possible ways that the various power supplies can be applied in various sequences.

More specifically, using prior art simulation methods, if the user does not propose a specific set of input conditions, then the key questions will not be addressed. In a complex chip, there could be hundreds of different state conditions to propose—Each one taking many hours or days to complete.

Layout checks methods are also not well suited for these purposes. Such prior art layout check methods primarily focus on single transistors (e.g. the "geometry", "shape", and "placement" of each transistor), but generally are not aware of the overall circuit function and state modes.

As will be discussed, the present invention discloses methods to automatically evaluate a circuit for various power sequence reliability risks in the following areas:
  Conducting current through parasitic diodes (leakage, battery draw)
  Conducting current at floating receiver inputs (leakage, battery draw, unintended logic states)
  Latch-up (stuck in an unrecoverable state).

As previously discussed, these risks tend to reduce or remove the ability of a given electronic circuit to be operative under certain power sequences, such as certain intended or unintended power-up states. In general, when a circuit (having a plurality of independently driven DC power paths) is driven (e.g. powered, such as powered-up or powered-down) by its plurality of independently driven DC power rails, unexpected and undesired events can occur, at least during some overall power sequences. Ideally, a circuit should be as robust as possible to various alternative power sequences, and should at least function adequately for at least one power sequence. For example, there should be at least one way to power-up a circuit so that it works (is "operative") according to the intended design.

As will be discussed, the present invention teaches computerized methods of analyzing a circuit's topology to directly find the various power sequence risks and to report which specific power sequences create these risks. By contrast, prior art simulation methods require that the problematic power sequences be identified before any risks can be reported.

Note that parasitic diodes are usually not explicitly called out in standard circuit netlists. However, the existence of such parasitic diodes can be automatically inferred because they are a byproduct of the MOSFET production process. Thus, the existence of a given MOSFET device can be used to deduce or infer the presence of parasitic diodes (MOSFET body diodes) associated with the given MOSFET device.

Put alternatively, the one or more computer processors used to analyze the circuit design (as expressed by the circuit's netlist) will typically be configured to use the MOSFET devices (such as the MOSFET devices found on the circuit's netlist) to determine the existence and path connectivity of the MOSFET body diodes (e.g. parasitic diodes) associated with any given MOSFET.

In some embodiments, as will be discussed, the invention can analyze a circuit, identify problematic sections and components likely to generate power sequence risks, and output power sequence risks and issues such as power-up and power-down power sequence dependency graphs, tables, or other type output showing these risks. Thus, the invention is able to take a circuit (e.g. a circuit netlist, usually stored in computer memory) as input, automatically determine these risks, and the problematic circuit portions involved, as well as automatically identify power sequences (e.g. power-up time sequences, power-down time sequences) that can cause (or mitigate) these risks.

Since it is cumbersome to enumerate "power-up or power-down sequence risks, or power-up time sequence risks, or power-down time sequence risks, or power level shift sequence risks, in general in this disclosure, the term "power sequence risk" will be used to denote a power sequence risk comprising any of a power-up or power-down sequence risk produced when the independently driven DC power rails differ in at least one voltage level according to time (e.g. order of switching in time).

BRIEF DESCRIPTION OF THE DRAWINGS

FIG. 9 shows the hidden power dependency issue with the circuit previously shown in FIG. 8. When the digital section is powered off, parasitic current leakage remains due to the parasitic body diode of the "keeper" MOSFET. The invention can detect this issue and can report it as being caused by an undesired domain leakage path" in the keeper MOSFET.

DETAILED DESCRIPTION OF THE INVENTION

Figure 1:
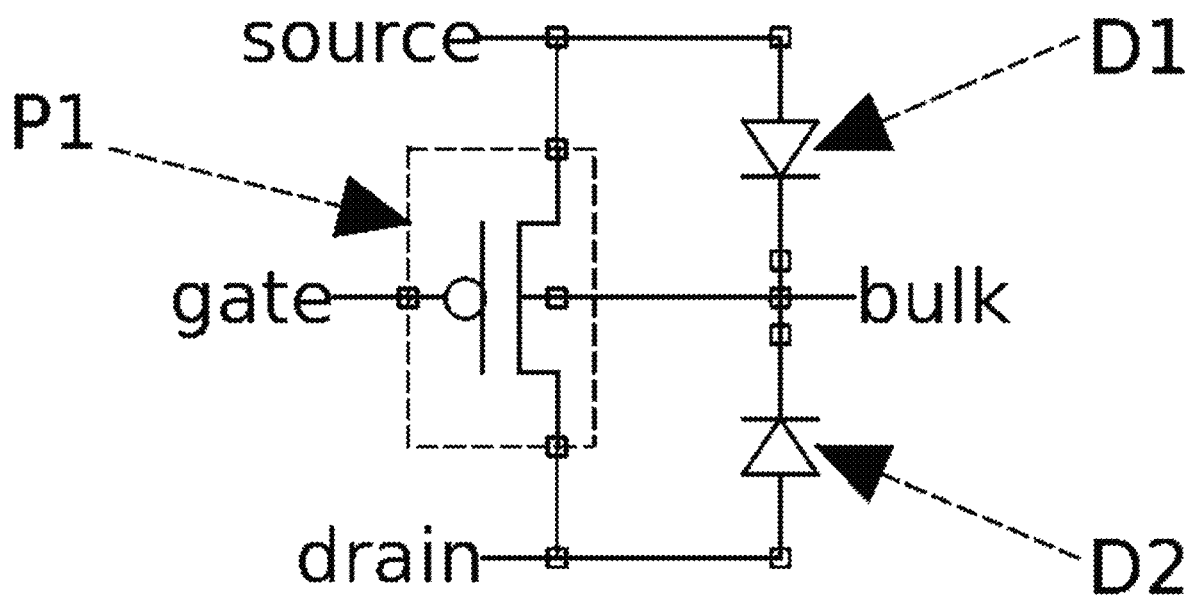
FIG. 1 shows an example of parasitic diodes that exist as by-product parts of MOSFET design.

The computer hardware that can be used to implement the present invention can typically comprise the computer processors, memory, and other computer hardware components as described by U.S. Pat. Nos. 8,225,251; 8,484,590; 8,504,957; 8,504,968; 8,595,660; 8,881,076; and 9,378,324, the entire contents of which are incorporated herein by reference. Although the invention will often be described in methods format, the invention can also be a computer system configured to implement the methods described herein, or even a computer readable medium having machine readable instructions for causing at least one computer processor to implement the methods described herein.

Key Concepts and Definitions:

Leak-down paths: normal stacks of PFET+NFET from power to ground. All circuits consist mainly of such stacks, so these leak-down paths are normal, account for 99% of circuit topology. When power is removed, the supply (power) level gradually sinks to ground (bottom of the stack). This is a normal situation.

Clamping paths: reverse diodes between power and ground. These are the stacks mentioned above. Normally leaking down gradually. But if supply (power) is forced negative (below ground, reversed), then the clamping effect immediately becomes strong. To try inverting the supply like this is virtually impossible, as 99% of the circuit will fight against the negation of supply. Forcing the supply inversion would be an unintended (and undesired) situation.

Forward bias body diode: If a PFET (or NFET) source or drain pin is lifted above (or below) the bulk pin voltage, the bulk-to-source or bulk-to-drain parasitic diode will start to conduct. This is a risk of a bad power-up and would be an unintended (and undesired) situation.

Parasitic BJT/SCR exists in the layers below the intended fabricated MOSFET in chip designs. If inverse bias is bad enough, this parasitic device can/will latch-up (stuck state). This is a primary risk of bad power-up. This would be an unintended situation.

Isolation: A small circuit topology providing a protection function, for when the sending driver of a signal is turned off. The receiving end (isolation part) is not at risk [of the floating input] as it is designed to provide the isolating function.

Isolation Control: A signal that is activated when a power-down state is applied. The control signal activates isolation functions at receivers that would otherwise be at risk.

Regulator is a MOSFET that translates a master supply (higher) to a lower supply output (lower). This MOSFET is connected between the two.

Power Switch is similar to a regulator (above) but does not translate values. It simply passes the same value from master to supply output.

Power Selector is a group of two or more power switches (above). They choose between more than one master supplies to a common output supply.

Floating signal input exists if a driver (e.g. a MOSFET driver) is not [yet] powered while the receiver (e.g. a MOSFET receiver) is powered. This is a primary risk of bad power-up. This would be an unintended and undesired situation.

Mismatched voltage signal input exists if a driver (e.g. a MOSFET driver) is powered by a lower voltage than the corresponding receiver (e.g. MOSFET receiver). This is another risk of bad power-up, and again would be an unintended and undesired situation.

D/S: Either drain pin or source pin of MOSFET.

Dependency Graph: Defines the relationship of power-on or power-off sequences (e.g. the order in time) between power and ground nodes. Shows, for example, that a given DC power supply X must not be powered up before a different DC power supply Y.

Note that in the discussion below, the invention may be viewed as being either a system, a method, or non-transitory computer-readable media comprising program instructions for causing at least one processor to perform a method. Although methods formats and examples will often be used, these methods formats and examples are not intended to be limiting.

In some embodiments, the invention may be a method of logically analyzing an electronic circuit for power sequence risks. This method will typically comprise loading an electronic circuit netlist comprising a plurality of MOSFET devices, and the paths (e.g. electrically conducting circuit traces) connecting them, into computer memory. As will be discussed shortly, this electronic circuit may often include other devices well.

Regardless of if it is listed specifically in the netlist, or not, by virtue of their design and manufacturing, MOSFET devices typically further comprise MOSFET body diodes (sometimes called parasitic diodes) as well. As will be discussed, the computer processor will typically be configured to consider such inherent MOSFET body diodes as well.

The invention will typically use at least one computer processor to trace these paths and determine a plurality of independently driven DC power paths, ground paths, and a corresponding plurality of independently driven DC power rails.

For these discussions, assume that the electronic circuit is intended (e.g. the design intent, although the design may be flawed) to be operative when this plurality of independently driven DC power paths is driven by the plurality of independently driven DC power rails according to at least one of a plurality of overall power sequences. For example, a complex electronic circuit, such as a complex large scale integrated circuit chip, may have 2, 10, or even 25 or more different power rails, all of which can be driven with different power supplies, according to possibly different supply voltages, and different power sequences (e.g. power-up sequences, power-down sequences, power shift sequences, and the like.) A correctly designed and operative electronic circuit should perform according to the design intent according to at least one power sequence, and hopefully will be relatively robust against undesired power sequences, such as might happen under abnormal operating conditions.

For various reasons (such as domain isolation) to be discussed, not every MOSFET device in the netlist may be analyzed during a particular analysis run. However, according to the invention, for each analyzed MOSFET device in the electronic circuit netlist, the at least one computer processor will scan (or analyze) the electronic circuit netlist, and determine which of the ground paths and the independently driven DC power paths are connected to the analyzed MOSFET devices.

Further, according to the invention, for each analyzed MOSFET device, the at least one computer processor will determine and storing in at least one data record (typically stored in computer memory), for at least those analyzed MOSFET devices with power sequence risks, those analyzed MOSFET devices that the at least one computer processor has determined can or potentially could represent a power sequence risk. The analysis is done by logical deduction, and somewhat resembles logical existence proof, but the overall effect of the analysis of the proof of risk existence is also a proof that risk exists at least some (or at least one) of the universe of overall power sequences for that circuit.

The risk analysis determines if a risk exists, in the circuit, for any of forward-biased MOSFET body diode circuit topology; and/or floating or mismatched MOSFET gate-input signal topology. This information will usually also be stored in the data records. These risks will be defined in more detail shortly. According to the method, the at least one computer processor will use these data records in its subsequent analysis, in particular, to automatically determine risks in the electronic circuit netlist and/or at least some of the various overall power sequences.

DC Path Tracing:

As discussed above, a number of the steps in the present disclosure require automatic computer system analysis of DC power paths. Here, the computer can receive a circuit netlist as input, and use various rules and algorithms to automatically determine at least some of the various DC power paths in the circuit. Here, the methods of Newcomb, U.S. Pat. No. 8,504,957 (which taught methods to automatically identify power and ground nets in an integrated circuit netlist), and Newcomb, U.S. Pat. No. 8,504,968 (which taught automated methods to determine high-level power distribution and interface problems in complex integrated circuits), or other methods, may be used. The complete contents of U.S. Pat. Nos. 8,504,957 and 8,504,968 are incorporated herein by reference.

For example, consider the situation where the overall power sequence comprises a power-up time sequence of a plurality of independently driven DC power rails, such as Rail a, then Rail b, then Rail c . . . and so on. Here assume that the underlying circuit, as reflected in the netlist, is such that each independently driven DC power path obtains its power from one specific independently driven DC power rail. However, netlists usually don't expose this relationship directly or easily. The method will conduct this path tracking analysis on the netlist, and further determine, for at least some of these independently driven DC power paths, which independently driven DC power paths derive power from which independently driven DC power rails. So, in essence, here the method will extract these sometimes-hidden relationships from the netlist.

In functional electronic circuits, generally, a DC path will typically exist between nodes A to B, passing through one or more electronic components. The highest-level node, which carries the most current, is often referred to in the alternative as a DC power rail. Note that although a given DC path may be potentially possible, due to various electronic switches, many of these potentially possible DC paths may often be turned off during actual circuit operation.

For the purpose of this patent, the computer system focuses on the question of if a DC power path is potentially possible, regardless of whether or not that circuit may be turned off during actual (or at least intended) circuit operation. So, in this analysis, with certain domain isolation exceptions to be discussed later, typically any series of one or more DC components (from pin to pin) will be considered to form a "DC path".

Thus, for example, the computer doing the analysis will be configured to recognize that the following component pins can be part of the DC path:

MOSFET between the MOSFET's source and drain pins
Resistor, or metal fuse link, between both pins.
Diodes, if they are pointing in the right direction (diodes pass current in one direction, but not the other).
And other less common DC device types, such as inductors By contrast, capacitors only pass AC power, and in this analysis, we are primarily concerned with DC power. Thus, the computer doing the analysis will typically be configured to recognize that a given DC path does not extend over a capacitor.

Thus, often the netlist will contain more devices than just MOSFETs and their intrinsic MOSFET body diodes. Often the netlist will further comprise other devices such as any of capacitors, other DC components comprising any of resistors, diodes other than MOSFET body diodes, and inductors. The netlist will also comprise any paths connecting any capacitors, resistors, diodes other than MOSFET body diodes, and inductors to at least the previously discussed MOSFET devices and MOSFET body diodes. The computer processor will often be configured to recognize these other devices and to determine their impact on the power sequence risks of the circuit as well.

In some embodiments, the computer system doing the analysis may be configured to perform some or all of the various method steps discussed below in Steps 1, 2, 3, 4, 5, and 6. Here assume that the netlist describing the circuit, where power sequence analysis is desired, has already been loaded into computer memory.

Step 1A: As an additional optional first step, the computer system can be configured to further accept input from a user defining or further refining the various power and/or ground nets in the analyzed circuit. This user input can, as specified by the user, supplement, replace, extend, or modify the computer's own analysis of the various power rails and DC power paths. Often, for example, it is useful to prove more intuitive names than may be obtained from the netlist, so that the human user may find the analysis easier to understand.

Thus, a user may further specify (e.g. input to the computer system) that, for example, a net (node) called "VDDA" is power for the chip's analog section, "VDDD" is power for the chip's digital section, "VSS" is ground net, and so on. It is not uncommon for there to up to 25 (or more) power and ground nets for the whole chip (or circuit), and it is useful to give the user the ability to further annotate such nets with additional explanatory information.

Step 1B: Although, as previously discussed, one strength of the invention is that it can determine power-up sequences without initial user input. However, in some embodiments, users may have preconceived ideas about using one or more previously established power-up sequences and may wish to evaluate them. Thus, in another embodiment, the user may optionally also define (input) one or more user-proposed power-up sequences. Thus, for example, if a user has identified power and ground nodes in step 1A above, the user may further wish to optionally define a user-proposed power-up sequence.

Here, for example, the user may use their definitions, previously input in step 1A (as desired), and input a power-up or power-down sequence in a table format. The top of each table column can be labeled as a particular power supply name. Each row can correspond to a finite state in the power-up sequence (e.g. a sequence ordered in time, which can be thought of as a time sequence, although here, each row can be merely the order in which the various power supplies are turned on or off). Each table cell can correspond to the value of one power supply during a particular power-up or power-down state. For example, see table 1 below:

Table 1: Example of a user-input power-up sequence, that the user can optionally submit to the computer system for evaluation for a particular circuit netlist.

|         | VDDA       | VDDB         | VDDC    |
|---------|------------|--------------|---------|
| state 1 | on, 1.0    | off          | off     |
| state 2 | on, 1.0    | off          | on, 1.6 |
| state 3 | on, 1.0-1.2| on, VDDA +0.6| on, 1.6 |

Here the "time" order is in the order: first state 1, and then second state 2, and then third state 3. Note that the value of the various DC power supplies (e.g. voltage, current), may also be specified, and the computer processor may be configured to analyze situations where the power supply is inadequate (e.g. voltage may be present, but the current is inadequate, or the voltage itself is inadequate) Table 1 can be interpreted as follows:

"off": The supply is off, not powered.
"on, 1.23": The supply is powered at a value of 1.23 volts.
"on, 1.2~1.3": The supply is powered and could be anywhere from 1.2 to 1.3 volts.
"on, VDDx": The supply is powered, and its given value is the same as other supply VDDx.
"on, VDDx +0.3": . . . as other supply VDDx plus 0.3 volts (or "−" for "minus").
"on, VDDx +(0.3~0.4)": . . . as other supply VDDx plus anywhere from 0.3 to 0.4 volts are higher.

Note that if the various power supplies are not related to each other, and/or are in separate groups, then two or more tables may be used, rather than one much larger fully enumerated table (this helps cut down on excessive combinations).

Step 1C: As another optional first step, the user may also define and input the various circuit isolation control nets. In essence, this helps tell the computer processor which MOSFET and other devices to analyze, and which to avoid because some devices on the chip may be isolated from the other devices. This helps cut down on false positives, and can also speed up the processing time. (Note that in some embodiments, the computer processor may further be configured to automatically recognize such isolated circuit domains, and to perform this step automatically.)

Isolation control can be viewed as being a "low power enable signal", normally used to protect certain areas of the circuit at times when power is removed from other areas. This definition may come from industry-standard sources such as "UPF" files, or may simply be a list of net names.

In some embodiments, in subsequent steps, isolation will indicate which power state combinations (dependency graph) are allowed (intended, isolated) rather than disallowed.

Step 2: Analyze the relevant circuit diodes.

In this embodiment, the computer processor will often be configured to further determine those analyzed MOSFET devices that are connected to two different independently driven DC power paths. The at least one computer processor will analyze a topology of their MOSFET body diodes with respect to these paths, and determine if there is a risk that a polarity of these body diode circuits could ever be forward-biased. If so, this is a risk.

Before delving into the specifics of step 2, a discussion of diodes is in order. Diodes have electrical polarity, with an anode and cathode, and only conduct current (e.g. DC current) in one direction. They do not conduct current in the opposite direction and are usually used in chip design to prevent current from flowing in the wrong direction (which might create a short circuit). In particular, of the thousands, millions, or billions of diodes in integrated circuit design, all should be oriented in the correct direction so as to prevent accidental current flow.

Specifically, each diode must be oriented with the correct polarity with respect to the various circuit power and ground DC power paths. Otherwise, power will flow through the diode to the ground, resulting in an effective short circuit and undesired power flow.

According to the invention, the computer system can be configured to automatically perform various logical tests to check for correct diode orientation, over effectively all logically possible power sequences.

In some embodiments, the computer system can further be configured to note the orientation of the majority of diodes along a given DC power path, and note which diodes may deviate from this majority. The computer system can further be configured to recognize that to avoid undesired current flow through a given diode, therefore the power sequence impacting that particular diode should be such as to avoid this undesired current flow. So, within a given circuit, the orientation of the various diodes can provide important clues to the computer system as to what power sequences can be acceptable, and which power sequences can be problematic (have risks). Those power-up or power-down sequences that send power to the diode in the wrong direction are problematic and should be avoided. Thus, the invention, in part, is further inspired, in part, by the insight that this diode orientation provides important information relative to both desired and undesired power (e.g. power-up, power-down) sequences for that particular chip under analysis.

Thus, the computer system can be configured to, for example, use the diode orientation to derive various power dependency graphs. For example, consider a chip with an electronic circuit design with a million diodes and five independent DC power supplies. Some of these diodes will be on one supply, and some will be on another supply. The computer system can be configured to analyze all million diodes, and create statistics as to the suitability of the five power supplies under all possible power sequences. Most of the time, most of the diodes will give consistent results (that is, usually most diodes will be pointing in the right direction), however, any inconsistent diodes (diodes pointing in the wrong direction) will stand out because they logically conflict with the majority of the other diodes. In essence, the incorrectly oriented diode or diodes will be a "minority vote" in conflict with the "majority vote" of the other diodes. Such "minority vote" diodes (diodes oriented inconsistently with other diodes in their peer group) can raise "red flags" or potential error conditions that the computer system can then report.

Put alternatively, in some embodiments, according to the invention, the at least one computer processor will further use the previously discussed data records to automatically determine, for those analyzed MOSFET devices connected to a same set of independently driven DC power paths, the status of the majority of the analyzed MOSFET devices and MOSFET body diodes. This is like a "majority vote". The computer processor will further determine those analyzed MOSFET devices and/or MOSFET body diodes that have risks inconsistent (minority vote) with a majority (majority vote) of the analyzed MOSFET devices and/or MOSFET body diodes in the same set of independently driven DC power paths. These findings can be used to flag risks (error conditions), as discussed above.

Note the difference between the invention's logical analysis method, and prior art simulation methods. The invention's logical methods essentially operate over every possible power state and thus can see everything, while prior art simulation methods can, at best, analyze that subset of every possible power state anticipated by the user.

Step 2 (specific methods): Diode issues: For each analyzed MOSFET in the input netlist, the computer system is configured to check for the risk of forward-biased body diodes. To do this, the computer system will typically be configured to trace the various DC paths from the MOSFET D/S (e.g. the drain pin or source pin of the MOSFET) and the bulk pins to the relevant DC power or ground rails. The computer is further configured to recognize that the MOSFET is at risk if the D/S rails could potentially not be powered the same as the bulk rail (note that the bulk rail could have an independent voltage, and with diode forward conduction, could be at risk).

Note that each MOSFET will only have two rails: the MOSFET anode rail and the MOSFET cathode rail. This is the basis for the individual raw data records that will be stored in the computer's memory. In one embodiment, the algorithm can include steps such as:

Find analyzed MOSFETs at risk of forward bias (conduction) body diodes, by:

Scan a listing of all analyzed MOSFETs in the circuit, either by recursion, breadth-first search, or another method. In a functional circuit, each MOSFET will have associated connections (each MOSFET pin will be connected to a net).

For each particular MOSFET, examine the connected nets on the MOSFET drain, source, and bulk pins. Determine whether the nets are power or ground themselves, or trace a DC path to another power or ground such as a DC power rail.

Figure 2:
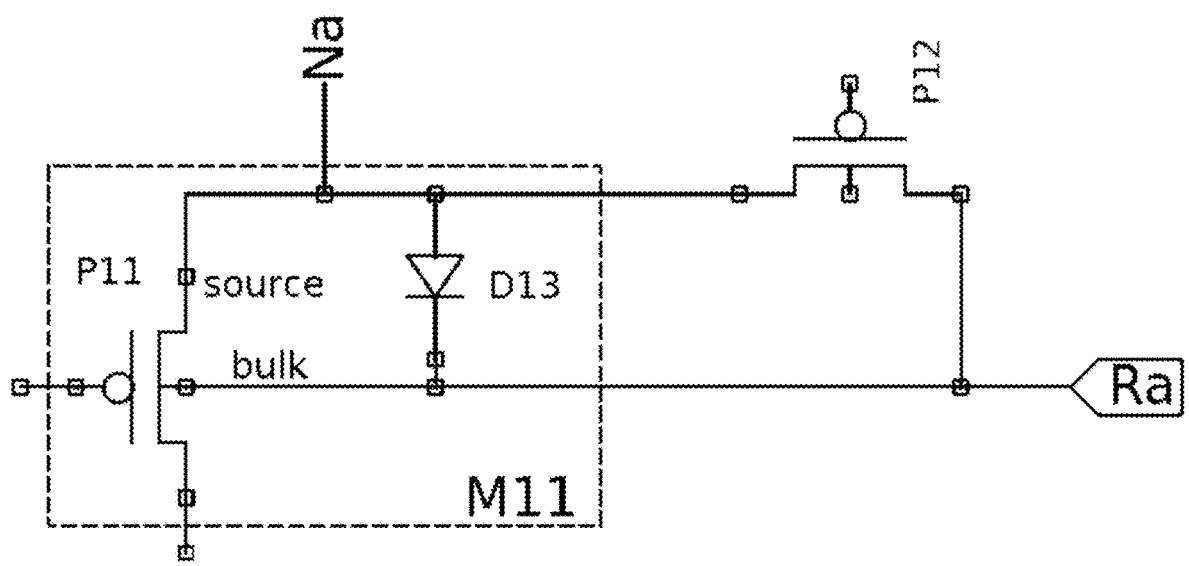
FIG. 2 shows an example of a MOSFET device, and associated diode, where both devices are ultimately connected to only one power supply rail Ra. Here there is no risk of a forward-biased body diode circuit.

A circuit example where there is not a problem: As shown in FIG. 2, MOSFET (P11) bulk is directly connected to supply rail Ra. The same MOSFET (P11) has a source pin on net Na (which is not a power or ground), and has a DC path through one other MOSFET (P12), finally reaching supply rail Ra. In this case, the given MOSFET (P11) is associated with rail Ra on both the source pin and bulk pin.

In addition, there is a parasitic body diode (D13) between MOSFET (P11) source and bulk pins. Together, P11 and D13 are both parts of the overall MOSFET (M11). Both diode pins are associated with the same supply rail Ra, so it can be concluded (e.g. the system can be configured to conclude) that there is no risk of forward conduction in that diode, between those pins. The two pins will always be at equivalent values, for all power sequences, because each is coming from the same power supply Ra. Logically Ra will always equal Ra.

This is an example of an "all good", "don't care" situation, at least with respect to power sequence analysis. That is, the computer system can conclude that this particular diode is not of concern to the analysis. There are many common circuit topologies where there is only one power supply in a given portion of the circuit. The computer system is configured to know that any power sequence issues will be elsewhere in the circuit.

Figure 3:
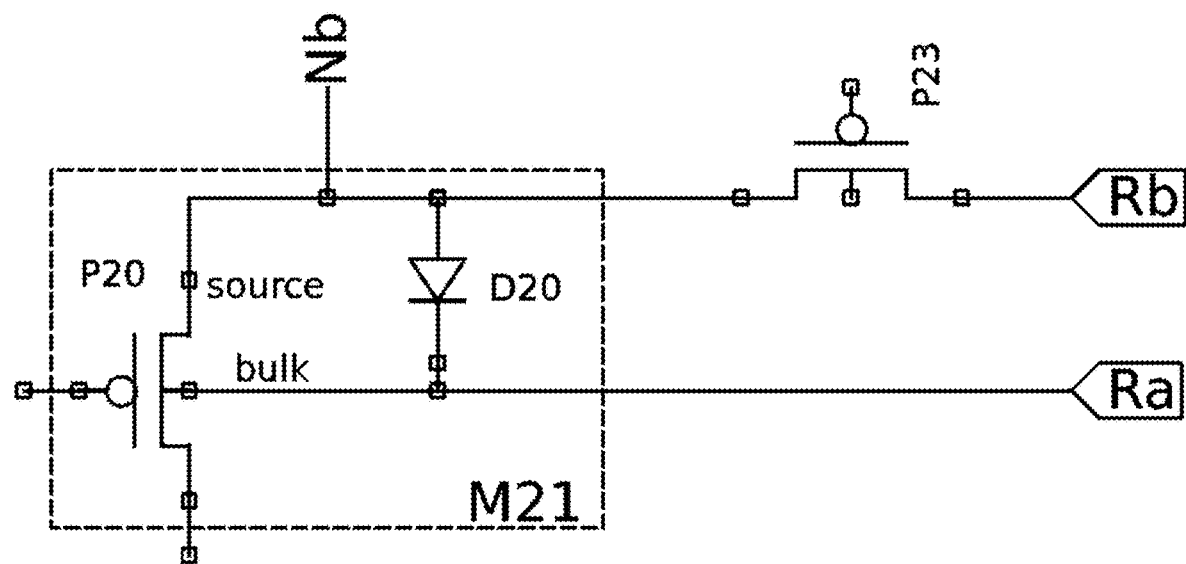
FIG. 3 shows an example of a MOSFET device, and associated diode, where the MOSFET and the diode are ultimately connected to two different power supply rails Ra and Rb. Here, under some power-up sequences, there can be a risk of a forward-biased body diode circuit.

A circuit example where there is a problem: FIG. 3 shows a contrasting example, where there is a problem. In FIG. 3, there is another MOSFET (M21), which contains primitive transistor (P20) and parasitic diode (D20). Here the source pin is connected to net Nb, and Nb is the start of a DC path through another component (P23) to supply Rb.

The same MOSFET (P20) has bulk pin on supply Ra. In this case, the association is source power=Rb, bulk power=Ra, which highlights a difference. The computer system can recognize this, and again remember is configured to focus on the possibility that in some situations, Ra will not equal Rb. The computer system is also configured with design rules to analyze the situation below.

In this example, MOSFET (P20) is a P-type MOSFET (P-MOSFET), which means that the parasitic diode (D20) is oriented (pointing) in the following direction: diode anode is the MOSFET source pin, diode cathode is the MOSFET bulk pin. From that, the computer system can be configured with the knowledge of the properties of these various circuit elements, and also obtain the specific circuit elements, and their associated circuit connections from the input netlist. The computer system can thus automatically conclude that there is a risk of forward conduction if (or when) Rb is at a higher voltage than Ra. This could happen if either both supplies are 'on' and Rb has the higher value, or if Rb is 'on' (with a positive value), and Ra is 'off' (essentially zero).

In one embodiment, the computer algorithm can thus include steps such as determining if:

If a forward conduction risk is detected on the given MOSFET (supplies are different on bulk pin vs S/D pin(s)), then form a raw "diode risk" data record, and store this record in memory. This data record can provide information such as:
The given MOSFET instance (such as "M23"), and its identifier within the circuit.
The pair of rails (Ra and Rb).
The association or orientation, based on diode found (Ra must be at the same or higher value than Rb, otherwise the diode will be in an undesired forward conduction state).
The relative strength of the association. This can be based on the distance via any DC path that may have been used to reach the rail(s). As the distance or length of the DC path(s) increases, the relative strength is decreased. A found MOSFET with long DC paths to rails (example: 5 other components linking each of 2 DC paths to 2 rails Ra and Rb) is "distant" and forms a "weak" association.

Step 3: The computer system is typically also configured to look for DC power sources that could cause floating or mismatched MOSFET input signals under some power (power-up, power-down) sequences.

Here, for example, at least one computer processor will be configured to determine which analyzed MOSFET devices connected and powered by two different independently driven DC power paths. Here, the analysis focuses on situations where a first independently driven DC power path powers (at the drain and source or D/S) the analyzed MOSFET devices, and a second independently driven DC power path powers the inputs to the gates (gate-inputs) of these analyzed MOSFET devices. The at least one computer processor is configured to further determine if, under at least some power sequences of the first and second independently driven DC power paths, if the first independently driven DC power path provides adequate power (drain and source, D/S) to the analyzed MOSFET device before the second independently driven DC power path provides adequate power to the gate-inputs. If the analyzed MOSFET device is powered-up, but the inputs to its gate are not, this is bad (has risk, such as floating gate risk).

This MOSFET checking step is not unlike the diode risk checking step done in step 2 above, but here, the computer system is looking at a different part of the circuit. In step 3, the computer system analyzes the MOSFET gates. The basic idea is that if the input to the MOSFET gate is powered by a DC power path and/or DC power rail that is different from the DC power path and/or DC power rail that powers the MOSFET device itself, then under some power-up or power-down sequences, floating gate type problems can occur. This thus provides a logical existence proof of yet another type of power sequence risk.

Usually, after the step 2 analysis (above) has been done, the computer system is further configured to automatically check each analyzed MOSFET for the risk of power sequence caused floating (or mismatched) input signals. To do this, the computer system will automatically trace several DC power paths. The computer system will automatically trace the DC path from the MOSFET gate pin to the relevant power rails. The computer system will also further automatically compare the DC power rails for the devices providing input to the MOSFET gate pin, with the DC power rails providing power to the MOSFET's drain or source (D/S) pins. These may not always be the same DC power paths, and thus power sequence problems can occur.

Here, a power source mismatch (the MOSFET gate input device is powered by a different DC power rail than the DC power rails powering the MOSFET's source and drain) indicates a possible power sequence risk. In particular, there can be a problem if a given receiver MOSFET is powered by its (D/S) supply rail Ra, but the signal input to that MOSFET gate is coming from a different DC driver device supplied by a different DC power rail Rb.

The computer system is configured to also use this rail pair is the basis of a raw computer "MOSFET risk" data record (also stored in memory), and is also configured to recognize that to prevent a floating situation, the receiver MOSFET's DC supply rail Ra must not be powered before (or be at a higher voltage level than) the MOSFET driver device DC supply rail Rb).

In one embodiment, the computer algorithm can thus include steps such as:
Find MOSFETs at risk of un-driven or under-driven inputs, by:
Similar to the biased diode methods discussed previously in step 2 above, a given MOSFET (during a processor analysis of all analyzed MOSFETs) is checked for connections, and these connections are traced through their respective DC power paths to the DC power supply or ground rails. The difference between this step, versus the previous biased diode method discussed in step 2 above, is that here the gate pin, rather than the bulk pin, is the one being compared against the MOSFET drain and source (D/S) pins.
If the gate pin reaches different supplies than S/D pins, this exposes a risk of under-driven or un-driven gate input.

Figure 4:
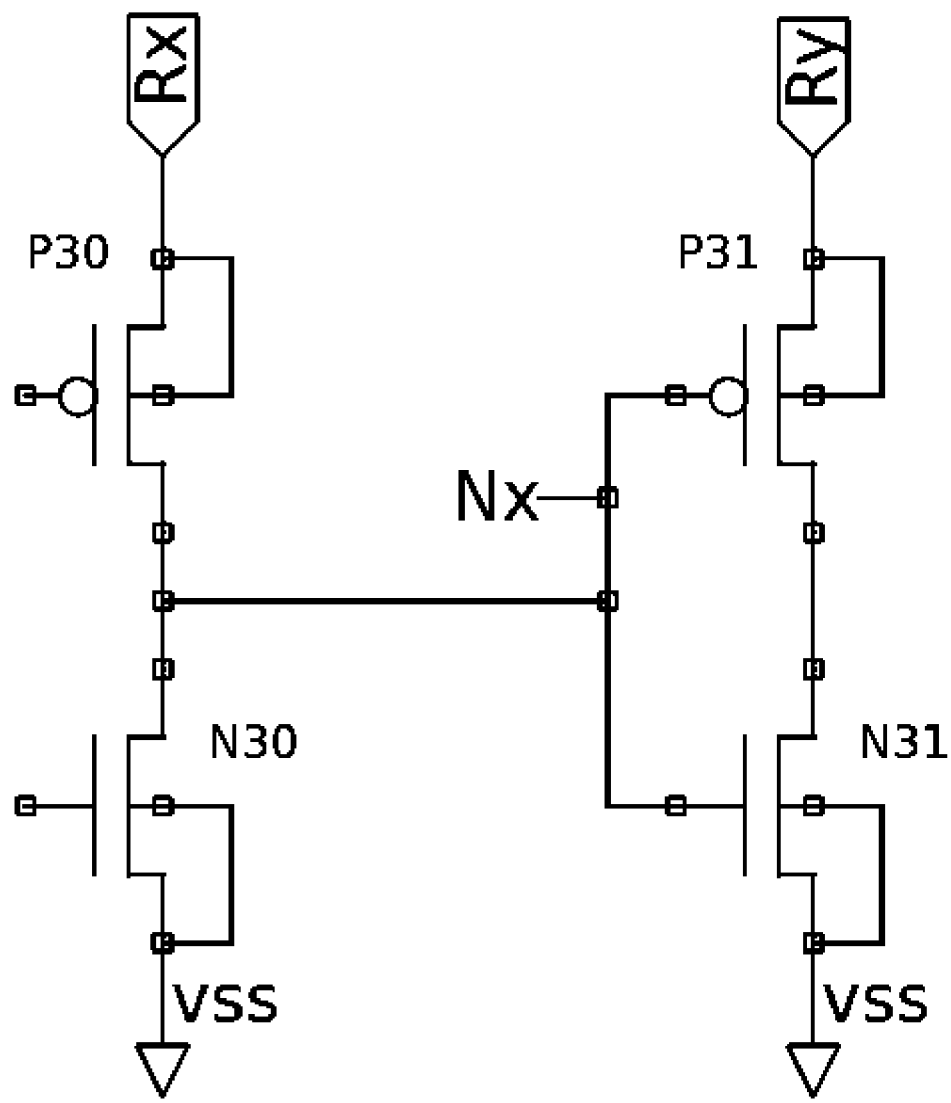
FIG. 4 shows an example where a MOSFET device, and another device providing input to the MOSFET device, are ultimately powered by two different power supply rails Rx and Ry. Here, under some power-up sequences, there can be a risk that the MOSFET will be un-driven or under-driven.

FIG. 4 shows how the invention's computer system can detect situations where improper power sequences can result in MOSFETs being at risk of being un-driven or under-driven.

In this FIG. 4 example, a MOSFET (P31) gate is connected to net Nx, which the computer system can determine has a DC power path (through P30) to DC power rail Rx. The computer system can also determine that on this same MOSFET (P31), the source pin is connected to rail Ry (or, could be connected to net Ny with DC path to rail Ry). Note that the computer system can be configured so that regardless of if this power connection is direct (as shown), or through a more complex DC path (as described earlier), the conclusion will be the same, which is that this MOSFET's source pin is associated with DC power rail Ry.

Thus, according to the invention, the computer system can determine that the gate of MOSFET P31 is "driven by" devices connected to DC power rail Rx, while the source and drain pins (S/D) of MOSFET P31 is "powered by" a different DC power rail Ry.

The risk, in this case, is that under some possible power DC power rail power-up or power-down time sequences, the first DC power rail Rx (powering the devices providing input to MOSFET P31) could be at a lower value than the DC power rail Ry powering MOSFET P31. In other words, in this situation, the gate for MOSFET P31 would be under driven (inadequate voltage or current value). A similar (related) related risk is that DC power rail Rx (powering the devices providing input to MOSFET P31) could be off, while DC power rail Ry, providing power to MOSFET P31, would be on. This would result in a floating gate situation for MOSFET P31 under this situation. Put alternatively, the computer system has done the analysis and provided an existence proof that, for this particular circuit there are some power sequence situations that will result in an under-driven or floating gate situation for MOSFET P31. There is a power sequence risk in this part of the circuit.

If, as in this example, the computer system further determines that MOSFET P31 is part of a CMOS structure (inverter topology), the computer system can be configured to conclude that the above risks are significant. Here, the design rule, which can be implemented in the computer system software, is that a CMOS structure must always be completely driven with a binary "one or zero" behavior. That is, the transistors must be either fully on or fully off. Thus, if the computer system determines that net Nx (DC power path Nx) is not fully powered to the same value (e.g. adequate voltage and current settings) as rail Ry, then MOSFET P31 may be operating in its partially conducting linear region. The computer system can be further configured to determine that in this partially conducting linear region, there will be undesired leakage current from P31 to N31. This is another risk factor.

Once the computer system determines that there is a risk of under-driven or un-driven gate, the computer system, as per the diode methods previously discussed in step 2, the computer system will typically further create another "MOSFET risk" raw data record, and also store this in computer memory.

This "MOSFET risk" raw data record may hold information such as:

The pair of DC power rails (Rx and Ry) involved in this situation.

The association and/or orientation, based on the gate pin's DC power rail (Rx in the example). Here the gate pin is essentially the power status of the device providing input to the MOSFET in question. The rule is that the gate pin's DC power rail or path must not have a lower value than the MOSFET's source and drain (S/D) pin's DC power rail, and/or, the MOSFET source and drain's DC power rail must not be 'off' while S/D pin's rail is 'on'.

A relative priority rank of the risk severity of the situation, depending on various factors such as:
  (A) if the MOSFET is part of a CMOS structure, then score this as being more important (here, the electrical design rules are that the CMOS structure must be fully driven, the CMOS structure cannot be under-driven).
  (B) if the MOSFET is a plain inverter type CMOS (not a logic gate CMOS), then also score this as being more important (this is because the CMOS is not isolation, but rather is clearly an under-driven or un-driven logic input, which is also risky).

Note that in some embodiments, the computer system can be configured to apply exceptions to this analysis. Consider, for example, situations where the computer system is either told, or automatically identifies that, certain MOSFETs are a) part of a defined isolation cell, and/or b) part of a CMOS structure that is also gated by a defined isolation control (previously discussed in step 1B).

For example, it is fairly normal and common to have circuit designs containing such gate intersections (e.g. the gate is coming from rail Rx, which could be turned off). This type of situation can be "safe", so long as these intersections are protected by "isolation" in a way that does allow such gates to be off as needed. It can thus be desirable to configure the computer system to take isolation controls into account in the analysis because this can reduce the number of false-positive findings. Methods to automatically recognize domain isolation cases were previously discussed by Newcomb in provisional application 62/826,333, filed Mar. 29, 2019, the entire contents of which are incorporated herein by reference. Additionally, or alternatively, the computer system can be provided with user input data that further defines which circuit domains are protected by isolation, and where analysis of MOSFETs and other devices in such isolated regions can thus be skipped.

Further discussion of step 3:

The computer analysis of the circuit can be simplified due to the fact that at this elemental MOSFET design level, each MOSFET floating gate type power sequence risk analysis usually involves at most only two different power supplies (pairs) per MOSFET device (different MOSFET devices may, of course, have different sets of at most two power supplies). So, the analysis can proceed at a "two at a time" pair of power supply analysis level. Each time, the computer system is concerned with the power supply that is powering the device supplying input to the MOSFET gate, and the power supply powering the MOSFET device itself as a receiver.

Note that the computer system can be configured to assume that if there are two independent power supplies, but both are in the same power state, there is no risk. But if there are some power sequence risks where driver power supply can be "off" or is at an inadequate voltage/current level, relative to the MOSFET receiver power supply, then there is a power-up sequence risk.

Thus, in FIG. 4 P31, the computer system can be configured to examine the topology of the circuit. The topology shows that the gate side of the circuit (left side) is on the Nx net powered by DC power rail Rx. This is one side of the DC power supply pair. The other side of the pair is the DC power rail for MOSFET P31. The computer system also follows the topology of the circuit on the right of FIG. 4 and finds that it is powered by DC power rail Ry. Here a simple topology inspection is enough to disclose that potential problems can exist under some Rx and Ry power-up or power-down sequences. The power sequence rule can be as simple as: Rx should never be off or lower than Ry.

So, the computer system can be configured to apply this pairwise analysis, using rules such as above, over and over again for the thousands, millions, or billions of MOSFET devices in the circuit. This generates a large number of raw data records for subsequent analysis.

To analyze this information, the computer system is further configured to pull the thousands, millions, or billions of "diode risk" and/or "MOSFET risk" raw data records, follow the relationships between the various circuit dependencies, and expose various power sequence risks. These methods often discover power sequence issues that otherwise would not be discovered wot prior art techniques. Such computerized methods of automatically analyzing a large number (often hundreds of thousands, millions, or billions) of raw data records, and exposing power sequence risks and dependency issues that otherwise might be overlooked, is discussed further in the next section.

As will be discussed, there are various ways of automatically analyzing this large number of raw data records, and reporting the results. One way is to use the raw data records to perform a feasibility analysis of a previously proposed power-up or power-down sequence. This technique, which can find power sequence issues that prior art often does not detect, is discussed in section 4 below.

Another way, which prior art methods cannot do at all, is to use the raw data records in an automatic computer system analysis and reporting of the various power dependencies that the system has observed. The computer system can do this automatically without any user given power sequence input. This will be discussed shortly in section 5.

Step 4: Contemporary Reporting: In one embodiment (which is optional), if the user has proposed one or more power-up and/or power-down sequences and input it into the computer system, the computer system can be configured to check the raw data records, previously discussed in steps 2 and 3 above, against the various user proposed power sequences. Here, for example, the user may be trying to validate one or more "favorite" or previously established "bad" power sequences against a new electronic chip design and wants to see if the chip operates as expected, or if there are design bugs that could make the new design operate in an unintended manner. Here, rather than evaluate all possible power sequences, the user is proposing (telling the system) to focus on, or only look at, a "user-proposed subset" of the overall (universe of all possible) power sequences.

In this embodiment, at least one computer processor will be configured to determine the suitability (e.g. relative risks of, impact on operability) of a user-proposed subset comprising at least one of the overall power sequences. Here, the computer processor(s) will select, from the various data records, those analyzed MOSFET devices with power sequence risk.

For each analyzed MOSFET device with power sequence risk, the computer processor(s) will use this user-proposed subset to determine the power sequences of those independently driven DC power paths for these analyzed MOSFET devices. The computer processor(s) will also determine if any members of this user-proposed subset result in a power sequence risk for that analyzed MOSFET device. The computer processor(s) will then typically report those members of the user-proposed subset that results in a power sequence risk for these specific analyzed MOSFET devices.

If the computer system finds cases where the raw data records are not compatible with one or more of the user proposed power sequences, the computer can then report this to the user. In some embodiments, the computer system may be configured to follow algorithms of the type shown below:

If the user has proposed one or more specific power-up or power-down sequences, these steps may now be done:
For all MOSFET devices being analyzed, for each MOSFET, and after the previously described diode-risk and MOSFET-risk checks described in steps 2 and 3 above, then:
If a raw data record has been made and exists for a given MOSFET, (a risk has been discovered), the computer system can then automatically validate this raw data record against the proposed sequence.
Here, for this validation, within the relevant raw data record, the computer system can use the two power rails (such as Ra and Rb) and automatically trace the corresponding DC power rails to the corresponding DC power paths in the proposed sequence.
If the two rails are present in the proposed sequence, the computer system can then automatically compare the requirements of the data record against the proposed relationship in the sequence.

In other words: If for a given analyzed MOSFET device, the corresponding data record stipulates that Ra must be powered in a sequence and level above and/or before Rb, then this should be supported (found) in a given proposed power sequence. However, if, for example, a given proposed power-up sequence defines Ra is powered at a level below Rb is powered, or at a time after Rb is powered (in order, and thus in time) then this is a conflict. Such a conflict indicates to the computer system that the user's proposed sequence will not work with the actual circuit, and the computer system can be configured to report this conflict. This reporting can be in real-time (hence the contemporary reporting designation) or can be output or stored in memory and reported on a non-real time basis as desired. This report can provide the MOSFET instance (e.g. identify the particular MOSFET that is the problem), the relevant DC power rail pairs involved, along with identifying the specific portions of the proposed power sequence that caused the observed problem.

One important advantage of this approach is that although it does require the user to input one or more proposed power sequences, the approach can report problematic issues immediately. So, it gives fast results, but on the other hand, this approach may miss something if the user has not anticipated all of the possible power-up or power-down sequences in advance.

As previously discussed, however, an important aspect of the invention is its ability to find power sequence problems for power-up or power-down situations that the user may not have anticipated. This more comprehensive analysis, which does not require that the user attempt to provide the power sequences in advance, is shown below. This more comprehensive analysis, shown in step 5 below, is called "back-end reporting".

Step 5: Back-end Reporting: This analysis option produces a power sequence circuit dependency "graph", typically outputting the results in terms of the names of the DC power rails (e.g. Ra, Rb, Rc . . . ) and the power rails power-up or power-down sequence (order of turning on and off in time, but without necessarily requiring any specific time intervals other than a before or after relationship).

Here, in this embodiment, the computer processor(s) can be configured to further use the data records to determine a power dependency sequence of power supplies required by the electronic circuit netlist according to the criteria that:

a) For those analyzed MOSFET devices that are powered or gate-driven by different independently driven DC power paths, the computer processor(s) will at least require that a first independently driven DC power path cannot be "off" while a second independently driven DC power path is "on". For example, the MOSFET device gate can't be driven by a first independently driven DC power path that is off while a second independently driven DC power path that powers the MOSFET device itself (i.e. drain & source) cannot be on.

b) The computer processor(s) will determine which analyzed MOSFETs are powered or gate-driven by different independently driven DC power paths.

c) The computer processor(s) will also, for at least one set of independently driven DC power paths, link all analyzed MOSFET devices that are powered or gate-driven by different independently driven DC power paths into a hierarchy. This hierarchy is ranked according to a time order in which the independently driven DC power paths must be powered to avoid any power sequence risk.

For ease in analysis, the computer processor(s) will also typically further determine and report which specific analyzed MOSFET devices and/or MOSFET body diodes required this time order according to the determined power dependency time sequence.

For example, DC power rail Ra is turned on either before or after DC power rail Rb and so on. Additionally, the specific parts of the circuit (reference circuit parts) are also given. For example, Ra references receiver MOSFET M1, Rb references driver MOSFET M2, and so on. Since this is easier to understand in a graphical format, this analysis is often referred to as a "graph", "graphical" output is but one way that the test results can be output. Thus this "graph" language is not intended to be limiting.

The computer system will be configured to output at least one overall power sequence output for any given circuit. In some cases, the system may be configured to output multiple power graphs or graph parts, particularly if the system finds that certain dependencies exist. Here, the system may operate according to various algorithms such as discussed below:

Method of automatically generating a circuit "Power Dependency Graph"

The computer system is configured to use any raw data records (e.g. diode and MOSFET raw data records produced during steps 2 and steps 3 above to produce a "Power Dependency Graph" (PDG) type analysis, according to the following rules and information:

Rail pairs: A particular rail cannot be 'off' (or at a lower value) when the other paired rail is 'on' (or at a higher value).

For a particular rail pair, the computer system will maintain references or links to the actual MOSFET instances that established the rail pair. This enables a user to question a particular rail pair determination and can find the appropriate MOSFETs in the circuit for further investigation.

Hierarchy structure: The computer system is further configured to produce an overall DC power rail graph that links all of the rail pairs into a complete hierarchy. Typically, in a power-up sequence "graph" the system will determine that one or more "top" rails must be 'on' first, followed by one or more "children" rails that are initially unpowered (or lower-powered) and should be powered later. If the computer system finds that some sets of rails do not have any cross association between their members, then multiple independent power sequence "islands" may be detected and reported.

Step 6: Report the dependency graph to the user ("show the allowed combinations").

These "Power Dependency Graph" results can be reported to the user in various graphical or non-graphical formats. The graphical option is easier to understand and will be discussed first. Here, for example, the computer system can be configured to print a listing, or graphical chart such as Gantt format, showing the relative sequencing (such as which comes first in time before the other) of power supplies required by the circuit.

Thus, in this embodiment, the computer processor(s) will be configured to further output this power dependency time sequence as a graph that visually shows the power dependency time sequence for at least one set of independently driven DC power paths.

Figure 5:
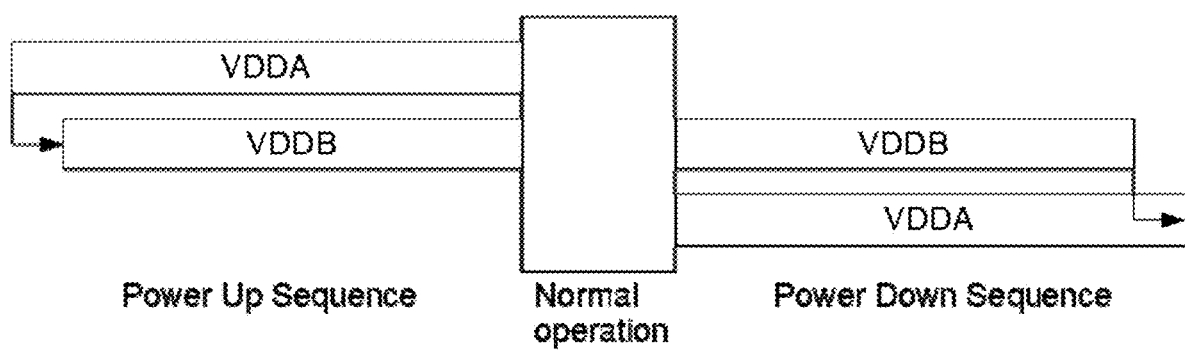
FIG. 5 shows an example of a power dependency graph.

FIG. 5 shows a simple example of a graphical version of a power dependency graph. Assume here that in the underlying circuit, the computer system has found that due to a single (and possibly unfortunate or undesired) parasitic diode, to avoid power-up risk (e.g. to prevent forward bias and current leakage) there is a requirement that the diode "anode must not be higher (voltage) than the diode cathode". The computer system has determined that therefore, the cathode power must be applied first, or at the same time, but not applied after the anode power. The computer system has also determined that the diode's cathode supply voltage must be higher, or at the same value, as the diode's anode voltage. Assume further that the computer has traced that the diode cathode has a DC path to "VDDA", and the diode anode has a DC path to "VDDB". The computer system can, therefore, conclude that to avoid power sequence risks, VDDA must be applied first, or simultaneous, and have a value greater, or same, as VDDB.

These findings are reported in an easy to view Gantt chart format in FIG. 5. Here the horizontal bars represent a timeline, and the alignment of bar endpoints (or overlapping) represents relationships in the various power rail power-on or power-off timing.

Figure 6:
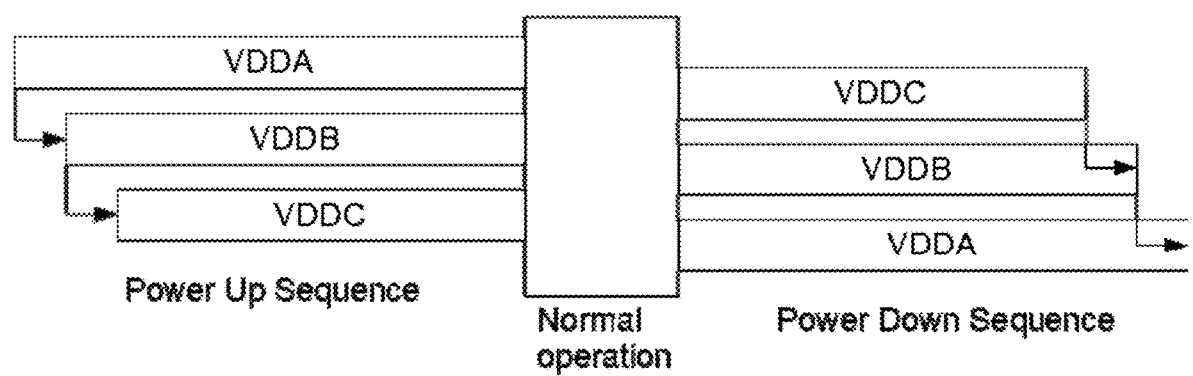
FIG. 6 shows an example of a power dependency graph for a more complex circuit powered by three independent power supplies.

FIG. 6 shows a different example of a graphical power dependency graph. In this example, assume that the circuit has three DC power rail supplies. Assume further that VDDA connects the anode of diode 1, VDDB joins the cathode of diode 1 and the anode of diode 2, and VDDC connects to the cathode of diode 2. Here the computer system has determined that in order to avoid power sequence risks, the power-up and power-down sequences shown in FIG. 6 must be followed.

Figure 7:
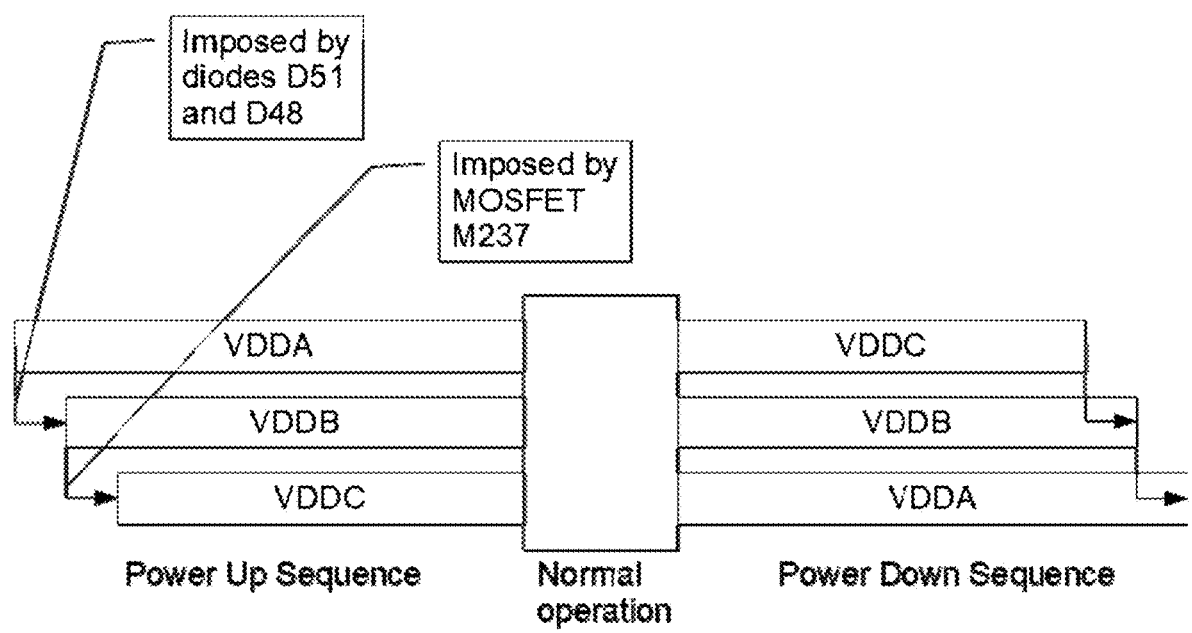
FIG. 7 shows an example of the power dependency graph from FIG. 6, here further annotated to show the original places in the circuit that created these various power dependencies.

What caused these power dependencies? To help the user determine exactly which portions of the circuit caused the reported power sequence issues, the system can also be configured to report these underlying circuit portions or components to the user. FIG. 7 shows an embodiment where the computer system is reporting the specific circuit diodes and MOSFET devices that generated the reported power-up sequence requirements (or dependencies). In this example, that would be the diode(s) found between supplies VDDA and VDDB, and VDDB to VDDC.

As per alternative non-graphical output discussed above, in some embodiments, the computer processor(s) can be configured further annotating this graph with information showing which specific analyzed MOSFET devices and/or MOSFET body diodes required (or were behind) this power dependency time sequence. In other words, the "trouble makers" can be identified.

The computer system can be configured to perform this analysis by determining which power sequences create step 2 diode and step 3 MOSFET "risks", and which sequences avoid these risks. If, for example, powering up a particular DC power rail Rn, before the others, results in a large number of "risks", the computer system will typically determine that rail Rn should be powered later. The power rail (or rails) that cause the fewest number of "risks" will tend to be first in a power-on sequence.

Occasionally the system may report "no solution" situations in which no power sequence avoids such risks. Here, the user (circuit designers) can query the computer system output, discover the underlying problem, and take corrective action to modify the circuit to avoid such problems in the future.

Thus, depending on the results, if unexpected problems are reported, the user may simply accept the relationships (normal operation). If problems are reported, the user may take steps to avoid or mitigate the problematic power sequence. Certain problematic power sequences can be avoided by, for example, writing instructions in the chip's data-sheet that prohibit the given illegal sequence. Alternatively, the user may decide to modify the circuit. This can be done by fixing bugs, changing MOSFET connections to survive the problematic power sequence, and the like.

Further discussion of domain isolation, and determining which MOSFET gates are "analyzed" MOSFET gates.

Complex electronic circuits are often organized according to different power domains, and it can be too confusing (generate too many false positive) if all of these domains are analyzed at the same time. To simplify the analysis, in some embodiments, the computer processor(s) will be further configured to use an isolation status of the MOSFET devices to automatically determine which MOSFET devices from the electronic circuit netlist are designated (and analyzed) as analyzed MOSFET devices. So, if circuit "domain 1" is being analyzed, the MOSFET devices are designated as analyzed MOSFET devices, but not the MOSFET devices in circuit "domain 2", and so on.

To expand upon this, in some situations, circuit designers realize in advance that certain portions (e.g. "power domains", also called just "domains") of the circuit have power requirements that are incompatible with other portions of the circuit (other "domains"). In these cases, the designers may have already employed various measures to electrically isolate the different domains. In such cases, as previously discussed, in order to avoid generating too many false positives, the computer system can either be instructed in advance to avoid analyzing certain domains, or alternatively can automatically determine the different power domains, and For example, as previously discussed in Newcomb, provisional applications 62/826,333 and 62/848,922, the contents of which are incorporated herein by reference. Domain isolation issues can occur in circuits that use multiple power supplies, it is common practice to turn off some supplies while others are still powered, such as might be done to conserve total circuit power consumption. This practice presents a reliability risk, where an input to a powered section of the circuit is left floating (not driven) by an output of a non-powered section of the circuit. To eliminate the reliability risk, a circuit design engineer will insert isolation cells at the inter-power boundaries, between the off, and on, sections. If the isolation cells are missing or improperly controlled, the reliability risks will not be eliminated. An example of such isolation cell would be a 2-input NAND gate, with one input acting as the control. When the control is driven to a low level, one NFET is turned off, and a non-driven state on the other input will have no effect, thereby posing no risk.

To ensure that the isolation cells and controls are properly implemented, the system may be configured with software that checks for the presence, style, topology, and control polarity of these isolation cells. Provisional application 62/826,333, discussed above, teaches additional software methods to automatically determine these issues. Alternatively, in the absence of such automatic isolation cell detection, the user may input such isolation cell information into the computer system either as an alternative to, or to supplement, such automatic isolation cell detection methods.

Other methods, such the level shifter identification technology previously taught by Newcomb in U.S. Pat. No. 8,595,660, which taught methods and system of automatically identifying level shifter circuits, may also be used to help identify different power domains. The complete contents of U.S. Pat. No. 8,595,660 are incorporated herein by reference.

In either case, the computer system can use such power domain information to determine that certain devices, in particular, certain diode or MOSFET devices, should not be analyzed in a particular computer analysis run, and to treat certain diodes or MOSFET devices in not-analyzed power domains as non-analyzed MOSFET devices.

Further Examples

Figure 8:
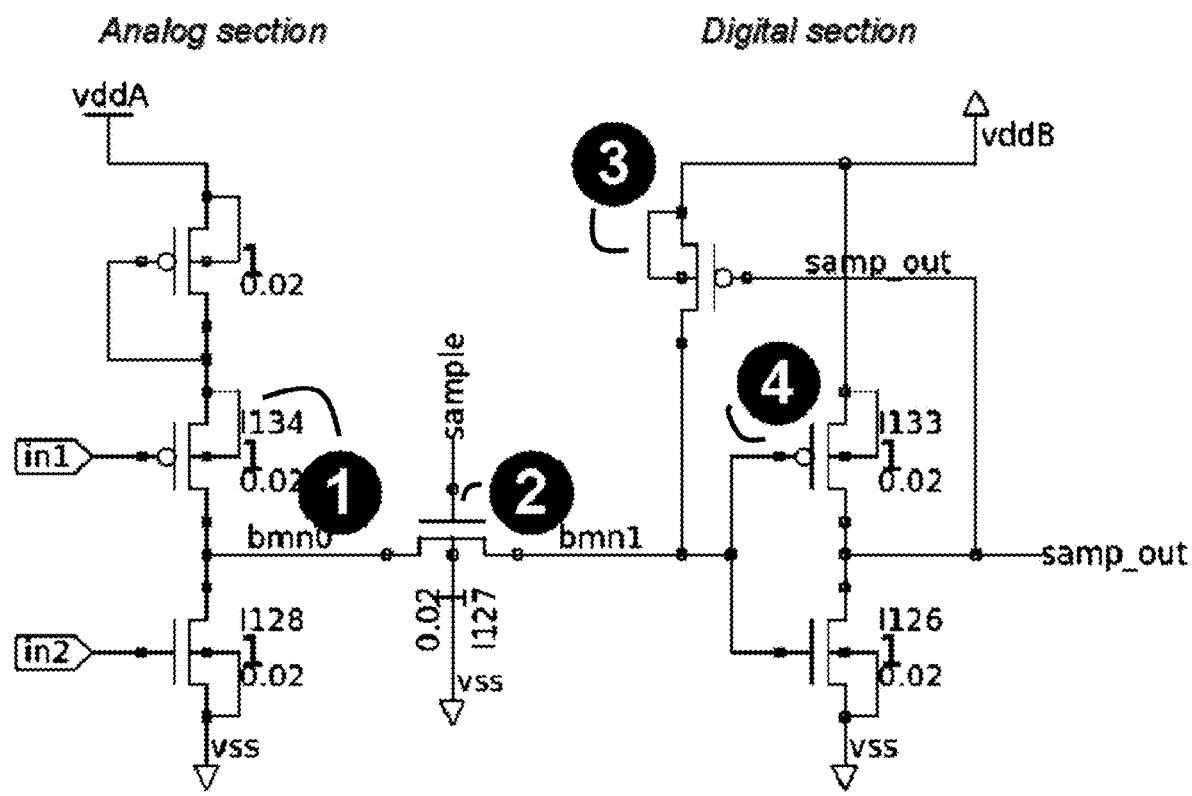
FIG. 8 shows an example of a circuit with analog and digital sections. This circuit has a power dependency sequence that would be difficult to detect using prior art simulation methods.

FIG. 8 shows an example where an analog circuit designer needs to sample a "ready" signal (1), in the digital section. In this example, passgate (2) may be turned off. So, a keeper (3) is placed on an inverter input (4). This circuit can pass simulation, and could even function in silicon.

However, as shown in FIG. 9, during certain incorrect power-up and power-down sequences, the digital section can be turned off. When the digital section is off, there is undesired leakage in the parasitic body diode of the keeper, creating a power sequencing problem. Fortunately, the invention can be configured to detect and report this type of power dependency sequence problem.

Here the underlying power sequence problem is caused by "domain leakage", and can be reported as such. An example of system output reporting on this power dependency sequence problem caused by a "Domain Leakage" circuit problem is shown in table 2 below.

Table 2: power dependency sequence problem caused by a "Domain Leakage"

| Category | Domain Leakage |
| --- | --- |
| Violation | "Domain leakage path? |
| Details | Current sink instance |
| given | Retrace path, all steps |
|  | Rail names |
|  | Power states: table & state |
|  | Voltage values |

The invention claimed is:

1. A method of logically analyzing an electronic circuit for power sequence risks, said method comprising:
    loading an electronic circuit netlist comprising a plurality of MOSFET devices, and paths connecting them, into computer memory;
    said MOSFET devices further comprising MOSFET body diodes;
    and using at least one computer processor to perform the steps of:
    tracing said paths, and determining a plurality of independently driven DC power paths, ground paths, and a corresponding plurality of independently driven DC power rails;
    said electronic circuit intended to be operative when said plurality of independently driven DC power paths is driven by said plurality of independently driven DC power rails according to at least one of a plurality of overall power sequences;
    for each analyzed MOSFET device in said electronic circuit netlist, scanning said electronic circuit netlist, and determining which of said ground paths and said independently driven DC power paths are connected to said analyzed MOSFET devices;
    for each analyzed MOSFET device, determining and storing in at least one data record, for at least those analyzed MOSFET devices with power sequence risks, that said analyzed MOSFET device has a power sequence risk, for at least some overall power sequences, due to any of:
    a) forward-biased MOSFET body diode circuit topology;
    b) floating or mismatched MOSFET gate-input signal topology;
    and using said data records to automatically determine risks in any of said electronic circuit netlist and at least some of said plurality of overall power sequences.

2. The method of claim 1, further determining, for those analyzed MOSFET devices that are connected to two different independently driven DC power paths, and a topology of their MOSFET body diodes with respect to said paths, if there is a risk that a polarity of their body diode circuit could ever be forward-biased.

3. The method of claim 1, wherein for those analyzed MOSFET devices connected and powered by two different independently driven DC power paths that comprise:
- a first independently driven DC power path powering said analyzed MOSFET devices, and a second independently driven DC power path powering gate-inputs to said analyzed MOSFET devices;
- further determining if under at least one power sequences of said first and second independently driven DC power paths, said first independently driven DC power path provides power to said analyzed MOSFET device before said second independently driven DC power path provides power to said gate-inputs.

4. The method of claim 1, further determining a suitability of a user-proposed subset of at least some of said overall power sequences, by selecting, from said data records, those analyzed MOSFET devices with power sequence risk;
- for each analyzed MOSFET device with power sequence risk, using said user-proposed subset to determine power sequences of those independently driven DC power paths for said analyzed MOSFET devices; and
- determining if any members of said user-proposed subset results in a power sequence risk for said analyzed MOSFET device;
- and reporting those members of said user-proposed subset that result in said power sequence risk for specific analyzed MOSFET devices.

5. The method of claim 1, further using said data records to determine a power dependency sequence of power supplies required by said electronic circuit netlist according to criteria that:
a) for those analyzed MOSFET devices powered or gate-driven by different independently driven DC power paths, at least requiring that a first independently driven DC power path cannot be "off" while a second independently driven DC power path is "on";
b) determining which analyzed MOSFETs are powered or gate-driven by different independently driven DC power paths;
c) for at least one set of independently driven DC power paths, linking all analyzed MOSFET devices that are powered or gate-driven by different independently driven DC power paths into a hierarchy, said hierarchy ranked according to a time order in which the independently driven DC power paths must be powered to avoid any power sequence risk.

6. The method of claim 5, further determining and reporting which specific analyzed MOSFET devices and/or MOSFET body diodes required said time order according to a power dependency time sequence.

7. The method of claim 6, further outputting said power dependency time sequence as a graph that visually shows said power dependency time sequence for said at least one set of independently driven DC power paths.

8. The method of claim 7, further annotating said graph with information showing which specific analyzed MOSFET devices and/or MOSFET body diodes required said power dependency time sequence.

9. The method of claim 1, wherein said overall power sequence comprises a power-up time sequence of a plurality of independently driven DC power rails, and wherein each independently driven DC power path obtains power from one specific independently driven DC power rail; and
- wherein said method further determines, for at least some of said independently driven DC power paths, which independently driven DC power paths derive power from which said independently driven DC power rails.

10. The method of claim 1, further using said data records to automatically determine, for those analyzed MOSFET devices connected to a same set of independently driven DC power paths, those analyzed MOSFET devices and/or MOSFET body diodes that have risks inconsistent with a majority of said analyzed MOSFET devices and/or MOSFET body diodes in said same set of independently driven DC power paths.

11. The method of claim 1, further using an isolation status of said MOSFET devices to automatically determine which MOSFET devices from said electronic circuit netlist are designated as analyzed MOSFET devices.

12. The method of claim 1, wherein said power sequence risk comprises any of a power-up or power-down sequence risk produced when said independently driven DC power rails differ in at least one voltage level according to time.

13. The method of claim 1, wherein said netlist further comprises any of capacitors, other DC components comprising any of resistors, diodes other than MOSFET body diodes, and inductors, as well any paths connecting any said capacitors, resistors, diodes other than MOSFET body diodes, and inductors to at least said MOSFET devices and MOSFET body diodes.

14. The method of claim 1, wherein said at least one computer processors uses said MOSFET devices to determine the existence and path connectivity of said MOSFET body diodes.

15. The method of claim 1, wherein said risks further reduce or remove the ability of said electronic circuit to be operative when said plurality of independently driven DC power paths is driven by said plurality of independently driven DC power rails according to at least one of a plurality of overall power sequences.

* * * * *